(12) United States Patent
Chen et al.

(10) Patent No.: US 8,553,030 B2
(45) Date of Patent: Oct. 8, 2013

(54) STEREO DISPLAY APPARATUS AND LENS ARRAY THEREOF

(75) Inventors: Chih-wei Chen, Taoyuan (TW);
Po-chuan Chen, Kaohsiung (TW);
Yi-pai Huang, Chiayi (TW); Syuan Li, Pingtung (TW); Jian-jun Li, Shenzhen (CN)

(73) Assignee: SuperD Co. Ltd., Shenzhen (CN)

( * ) Notice: Subject to any disclaimer, the term of this patent is extended or adjusted under 35 U.S.C. 154(b) by 218 days.

(21) Appl. No.: 13/076,376

(22) Filed: Mar. 30, 2011

(65) Prior Publication Data
US 2012/0162194 A1 Jun. 28, 2012

(30) Foreign Application Priority Data
Dec. 23, 2010 (CN) .......................... 2010 1 0602788

(51) Int. Cl.
*G06T 15/00* (2011.01)
(52) U.S. Cl.
USPC .......................................................... 345/419

(58) Field of Classification Search
USPC .......................................................... 345/419
See application file for complete search history.

(56) References Cited

U.S. PATENT DOCUMENTS

| | | | |
|---|---|---|---|
| 2005/0259323 A1* | 11/2005 | Fukushima et al. | 359/462 |
| 2006/0197725 A1* | 9/2006 | Nam et al. | 345/87 |
| 2010/0033813 A1* | 2/2010 | Rogoff | 359/463 |
| 2010/0309204 A1* | 12/2010 | Smith et al. | 345/419 |
| 2011/0175906 A1* | 7/2011 | Zheng et al. | 345/419 |

* cited by examiner

*Primary Examiner* — Aaron M Richer
*Assistant Examiner* — Vu Nguyen
(74) *Attorney, Agent, or Firm* — Anova Law Group, PLLC

(57) ABSTRACT

An exemplary stereo display apparatus includes a pixel array and a lens array. The pixel array includes a plurality of pixel units arrayed in parallel rows and parallel columns. The lens array covers the pixel array, and includes a plurality of lenticular lens units arrayed in said rows and columns. The lenticular lens units are parallel to each other, and the adjacent lenticular lens units arrayed in columns have a stagger arrangement along a first direction along which the pixel units are arrayed in rows, thereby the adjacent lenticular lens units arrayed in columns are arranged in terraced steps.

16 Claims, 12 Drawing Sheets

STEREO DISPLAY APPARATUS AND LENS ARRAY THEREOF

TECHNICAL FIELD

The present disclosure generally relates to a stereo display apparatus and a lens array employed in the stereo display apparatus.

BACKGROUND

A parallax characteristic of human eyes is applied by a stereo display apparatus to present stereo images having different space depth information when viewed with or without wearing special spectacles. Generally, a stereo display apparatus synthesizes a plurality of parallax views by a pixel arrangement algorithm and transmits the views to a stereo display device. Such parallax views are directly transmitted to left and right eyes of a viewer, and then synthesized a stereo image. The stereo display apparatus makes viewer have more real, more natural and more effective perception of space depth so as to obtain a three-dimensional (3D) information of an object.

A slanted lenticular lens (SLL) array including a plurality of lens units slantedly arranged is generally employed in a stereo display apparatus to solve a problem of nonuniform brightness, which is also called the moiré effect.

Referring to FIG. 1, an SLL array is employed in a typical 2-view stereo display apparatus to allow left eye images 1 and right eye images 2 passing therethrough, but the left eye images and the right eye images are seriously interfered after passing through the SLL array. In detail, the left eye images and the right eye images may be guided toward the same specific visual angle as illustrated by a dashed line a1 in FIG. 1. The viewer may be unable to achieve vivid stereo scenes due to brightness interference according to the above situation.

Referring to FIG. 2, left eye images and right eye images, labeled as two or more of blocks 1 to 8 in FIG. 2, may be guided toward a same specific visual angle when lens units of an SLL array are slantedly arranged in a typical 8-view stereo display apparatus, as illustrated by a dashed line b1 in FIG. 2.

Referring to FIG. 3, which is an optic emulation chart showing a relationship between the light intensity and the visual angle according to the SLL of FIG. 1. Judged from an overlapped zone m1 which represents light beams of the left eye images and the right eye images, the overlapped zone causing the brightness interference is improperly large.

What is needed, therefore, is a stereo display apparatus that can overcome the above-described deficiencies. What is also needed is a lens array employed in such stereo display apparatus.

BRIEF DESCRIPTION OF THE DRAWINGS

The components in the drawings are not necessarily drawn to scale, the emphasis instead being placed upon clearly illustrating the principles of at least one embodiment of the present disclosure. In the drawings, like reference numerals designate corresponding parts throughout various views, and all the views are schematic.

DETAILED DESCRIPTION OF EMBODIMENTS

Reference will now be made to the drawings to describe preferred and exemplary embodiments of the present disclosure in detail.

Figure 4:
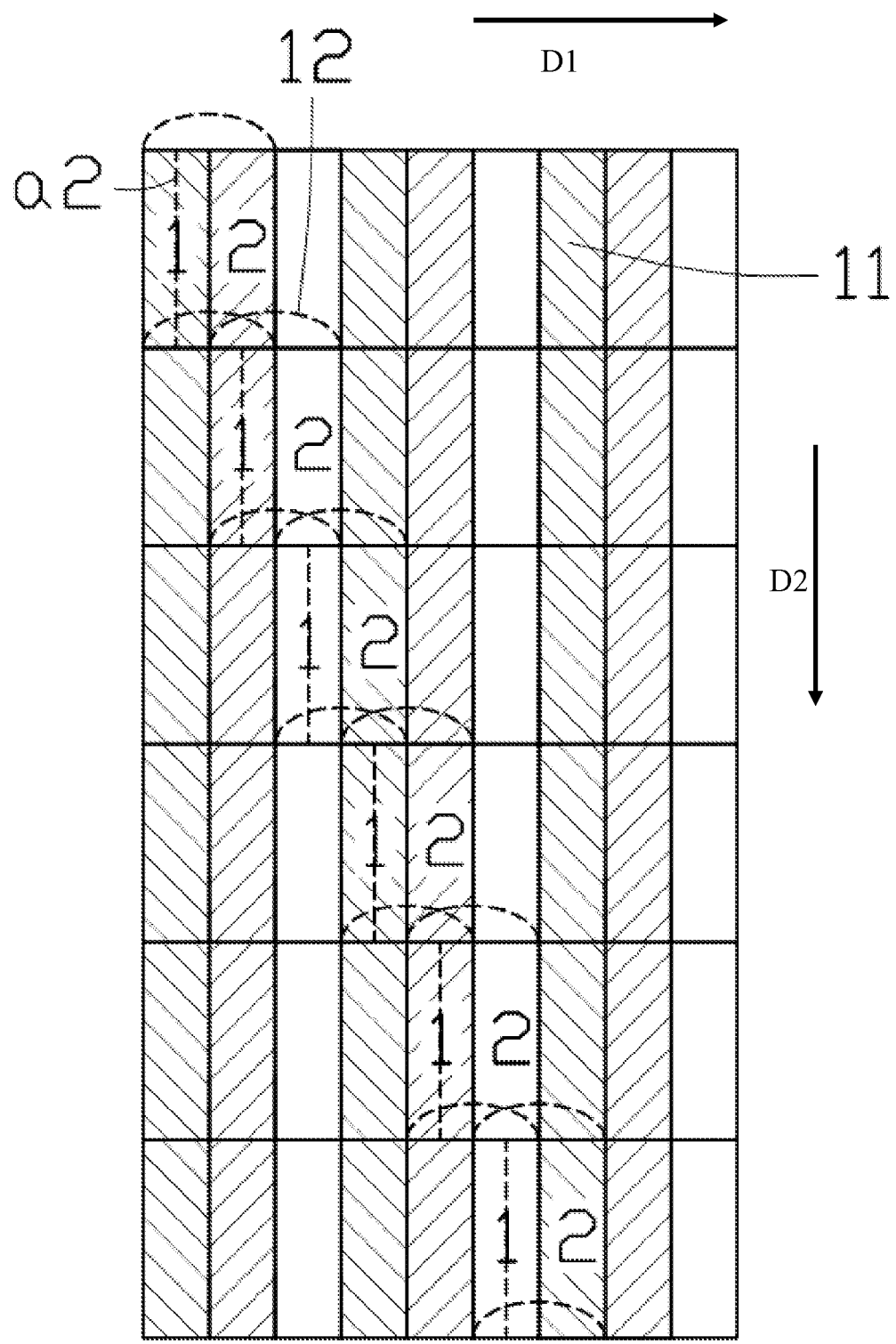
FIG. 4 shows a schematic, top plan view of a stereo display apparatus according to a first embodiment of the present disclosure.

Referring to FIG. 4, a stereo display apparatus according to a first embodiment of the present disclosure is a 2-view stereo display apparatus, and includes a pixel array and a lens array.

The pixel array includes a plurality of pixel units 11 arrayed in parallel rows and parallel columns. A direction along which the pixel units 11 are arrayed in rows is hereinafter defined as a first direction D1, and a direction along which the pixel units 11 are arrayed in columns is hereinafter defined as a second direction D2. In the illustrated embodiment, the pixel units 11 may be RGB (red, green and blue) pixel units of a liquid crystal display (LCD) apparatus or pixel units for independent address of other kind of display apparatuses. The pixel units 11 display first images (labeled as 1 in FIG. 4) and second images (labeled as 2 in FIG. 4) along the first direction D1, alternately. Every two adjacent first images or second images have a stagger arrangement, and a staggered step therebetween equals to a width of one pixel unit 11 as measured along the first direction D1.

The lens array covers the pixel array, and includes a plurality of lens units 12. In the illustrated embodiment, the lens units 12 are lenticular lens units arrayed along the first direction D1 and the second direction D2, respectively. That is, the lens units 12 are arrayed in said rows and columns. The lens units 12 are configured for guiding the first images and the second images in different directions, in case that the first images and the second images can be viewed by a left eye and a right eye of a viewer, respectively. In order to conveniently describe the present disclosure, only one group of lens units 12 is shown in FIG. 4.

In the illustrated embodiment, the lens units 12 extend along the second direction D2 in parallel, and the adjacent lens units 12 arrayed in columns have a stagger arrangement along the first direction D1, thereby the adjacent lens units 12 arrayed in columns are arranged in terraced steps. In detail, each lens unit 12 covers two pixel units 11 along the first direction D1 and one pixel unit 11 along the second direction D2. Meanwhile, every two adjacent lens units 12 arrayed along the second direction D2 have a stagger arrangement along the first direction D1, and a stagger step therebetween equals to a width of one pixel unit 11 as measured along the first direction D1.

Figure 1:
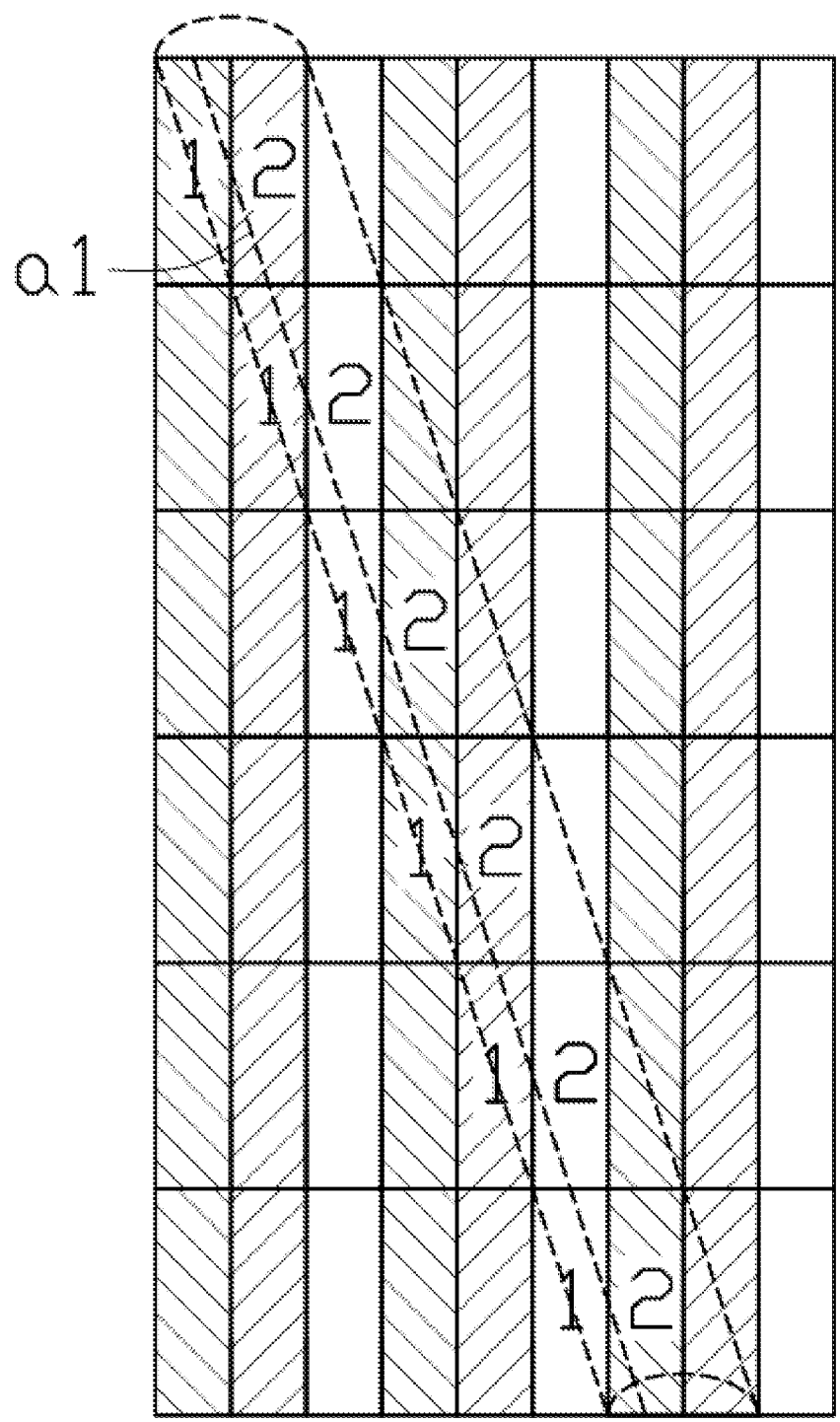
FIG. 1 shows a schematic, top plan view of a conventional 2-view stereo display apparatus.

With the above-described configurations, the first images or the second images in different rows are immobile corresponding to the portions of the lens units 12 with same optical features, and can be guided toward a same visual angle. Referring to a dashed line a2 of FIG. 4, only the first images are guided to the dashed line a2. Compared with the dashed line a1 of FIG. 1, the problem of interference or crosstalk between left eye images and right eye images may be solved, and vivid 3D scenes with uniform brightness can be viewed by the viewer.

Figure 5:
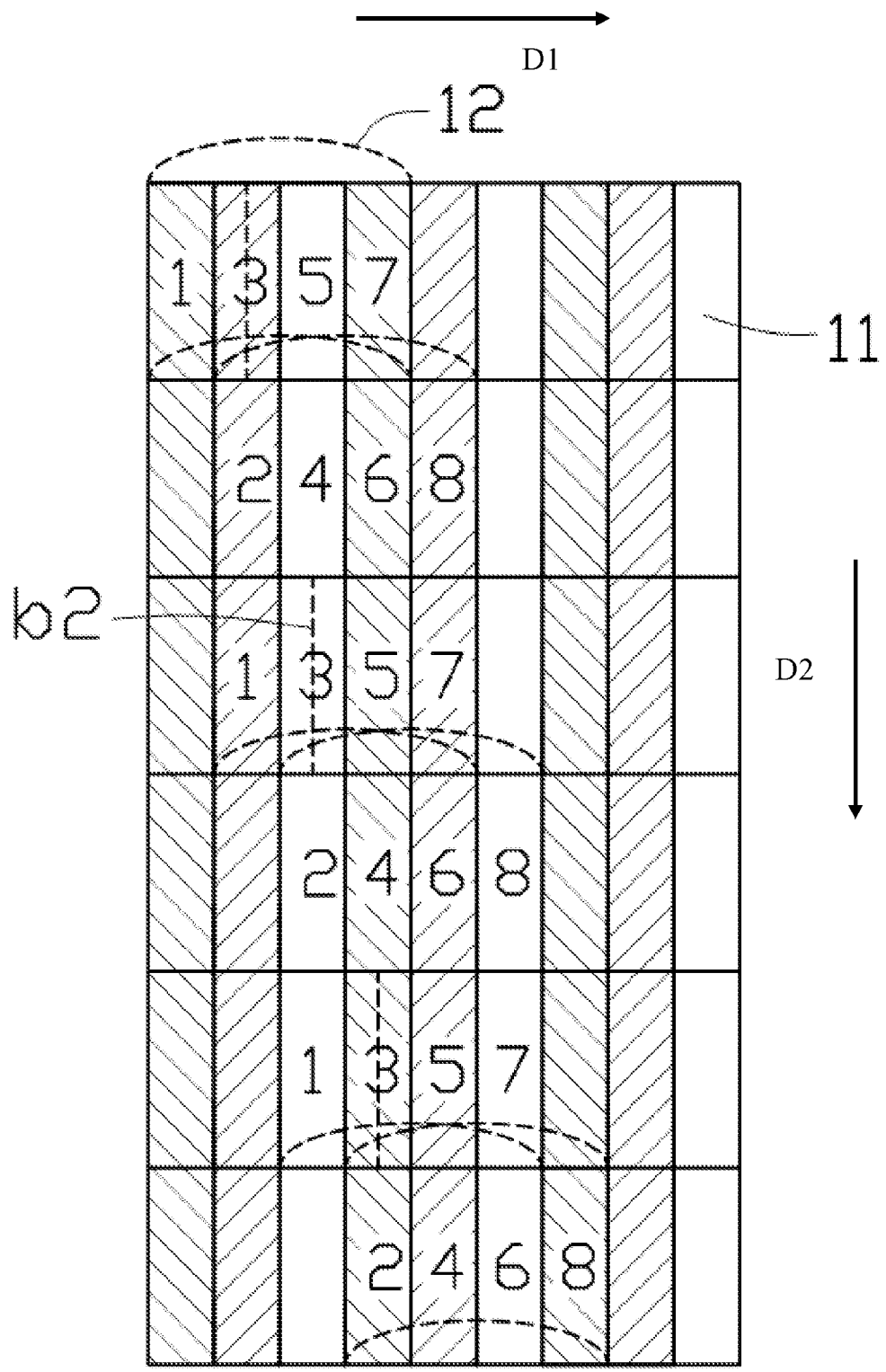
FIG. 5 shows a schematic, top plan view of a stereo display apparatus according to a second embodiment of the present disclosure.

Referring to FIG. 5, a stereo display apparatus according to a second embodiment of the present disclosure is shown. The stereo display apparatus of the second embodiment is an 8-view stereo display apparatus, and is similar to the stereo display apparatus of the first embodiment. The stereo display apparatus includes a plurality of pixel units 11 and a plurality of lens units 12. The pixel units 11 of two adjacent rows arrayed along the second direction D2 display four images (labeled as 2, 4, 6 and 8, and 1, 3, 5 and 7 in FIG. 5) along the first direction D1, alternately. Every two adjacent images displayed along the second direction D2 have a stagger arrangement, and a stagger step therebetween equals to a width of one pixel unit 11 as measured along the first direction D1.

Each lens unit 12 covers four pixel units 11 along the first direction D1 and two pixel units 11 along the second direction D2. Every two adjacent lens units 12 arrayed along the second direction D2 have a stagger arrangement, and a stagger step therebetween equals to a width of one pixel unit 11 as measured along the first direction D1.

Figure 2:
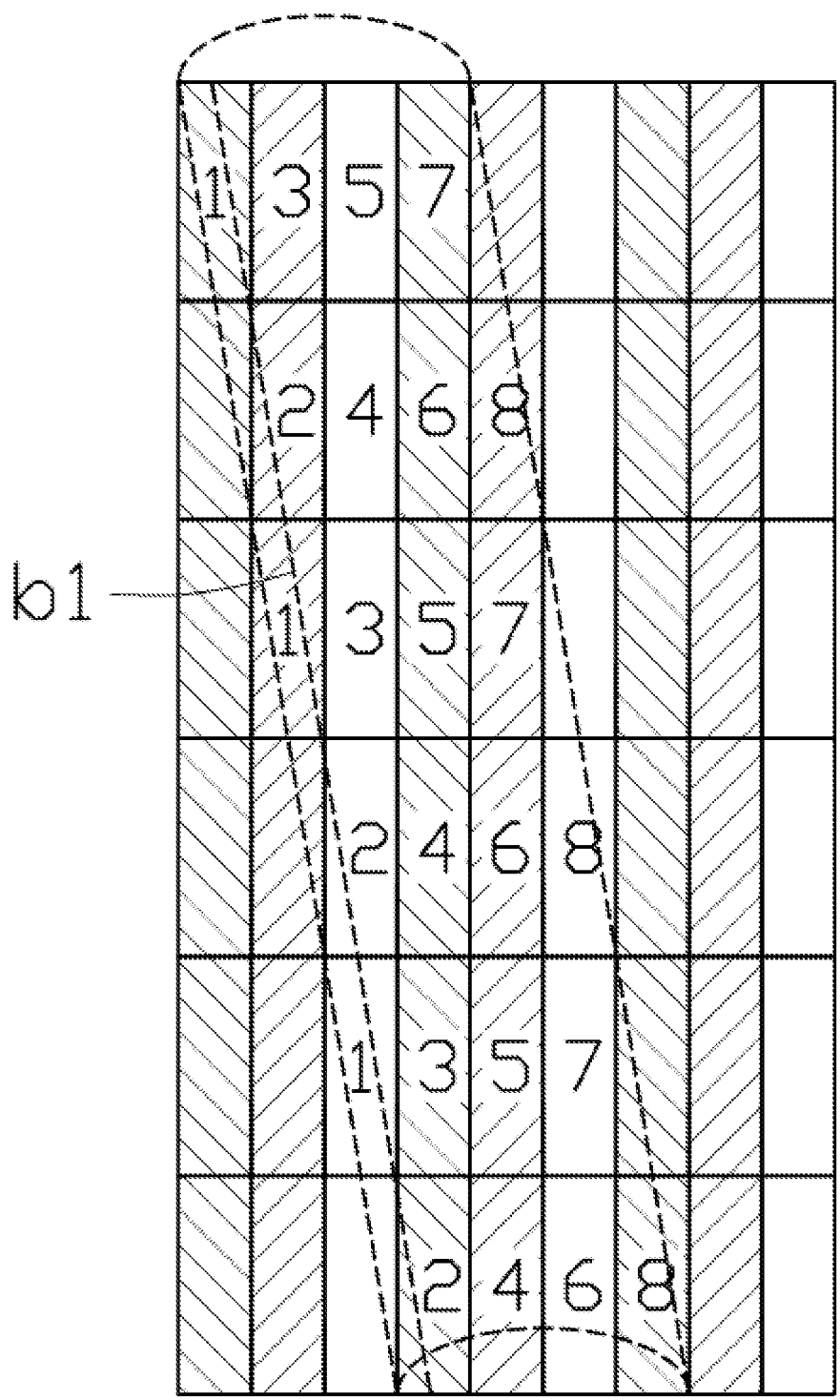
FIG. 2 shows a schematic, top plan view of a conventional 8-view stereo display apparatus.

Because the adjacent lens units 12 are arranged in terraced steps, images of one same kind in different rows are corresponding to the portions of the lens units 12 with same optical features, and may be further guided toward a same visual angle. Referring to a dashed line b2 of FIG. 5, only the images 3 are guided to the dashed line b2. Compared with the dashed line b1 of FIG. 2, the stereo display apparatus of the second embodiment may solve the problem of interference or crosstalk between left eye images and right eye images, and vivid 3D scenes may be viewed.

Arrangement of the lens units 12 of FIG. 4 and FIG. 5 are schematic, and should not be limitations to the present disclosure.

In alternative embodiments, each lens unit 12 may cover n pixel units 11 along the first direction D1 and r pixel units 11 along the second direction D2. Every two adjacent lens units 12 arrayed along the second direction D2 have a stagger arrangement along the first direction D1, and a stagger step therebetween equals to a width of m pixel units 11 as measured along the first direction D1. Wherein n represents a positive integer greater than 2 or equals to 2, m represents a positive integer less than n, and r represents a positive integer greater than 1 or equals to 1. Preferably, n represents a quantity of the images displayed along the first direction D1 by the pixel units 11 arranged in the same row, and m represents a quantity of the pixel units 11 forming a stagger step between every two adjacent images displayed along the second direction D2.

In the present disclosure, the lens array may be made from appropriately transparent materials by an extrusion forming method or a laser engraving method. The lens array may also be a liquid crystal lens array.

Figure 6:
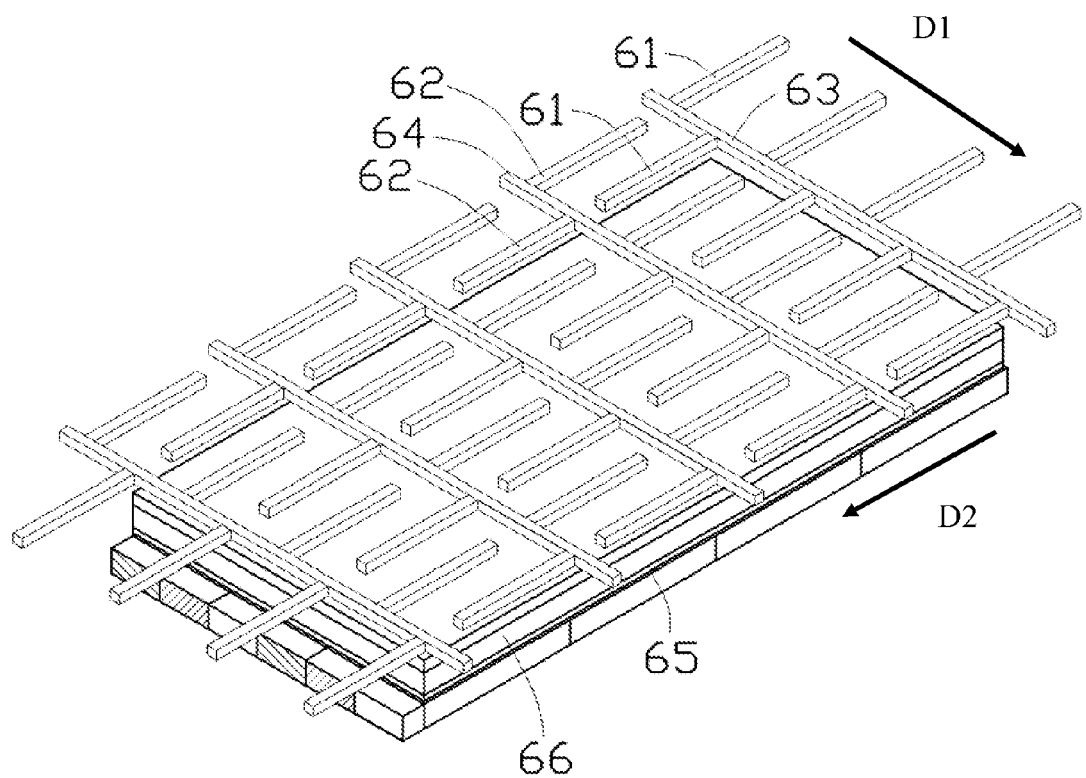
FIG. 6 shows a schematic, isomatic view of a stereo display apparatus according to a third embodiment of the present disclosure.

Referring to FIG. 6, a stereo display apparatus according to a third embodiment of the present disclosure is shown. The stereo display apparatus of the third embodiment is a 2-view stereo display apparatus. The lens array is a liquid crystal lens array, and includes two groups of working electrodes 61, 62 extending along the second direction D2. The lens array further includes a plurality of connection electrodes 63, 64. The connection electrode 63 connects the working electrode 61, and the connection electrode 64 connects the working electrode 62.

In the illustrated embodiment, the working electrodes 61, 62 of different groups are spaced from each other and have a stagger arrangement along the first direction D1. The adjacent working electrodes 61, 62 of the same group along the second direction D2 have a stagger arrangement. In the illustrated embodiment, the working electrodes 61 staggerly extend from two opposite sides of the connection electrodes 63, the working electrodes 62 staggerly extend from two opposite sides of the connection electrodes 64, and the working electrodes 61, 62 of the same side are spaced from each other, respectively.

Furthermore, organic or inorganic material having high resistance may be arranged between the adjacent working electrodes 61, 62 for achieving a uniform electric field therebetween.

Referring to FIG. 6, the lens array further includes a common electrode 65 spaced from the working electrodes 61, 62, and a liquid crystal layer 66 arranged between the common electrode 65 and the working electrodes 61, 62.

Figure 7A:
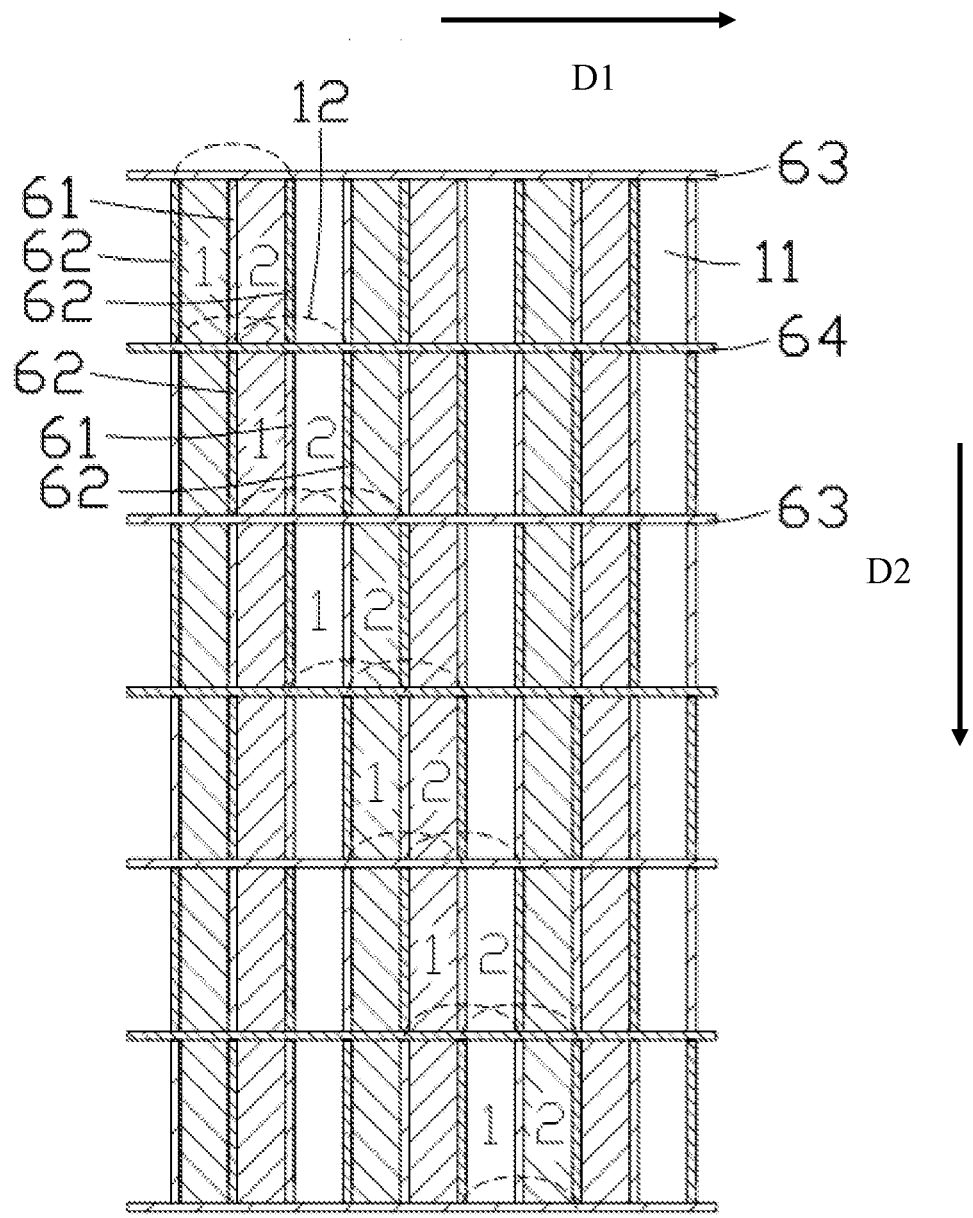
FIG. 7A and FIG. 7B show schematic, top plan views of the stereo display apparatus of FIG. 6, respectively.
Figure 7B:
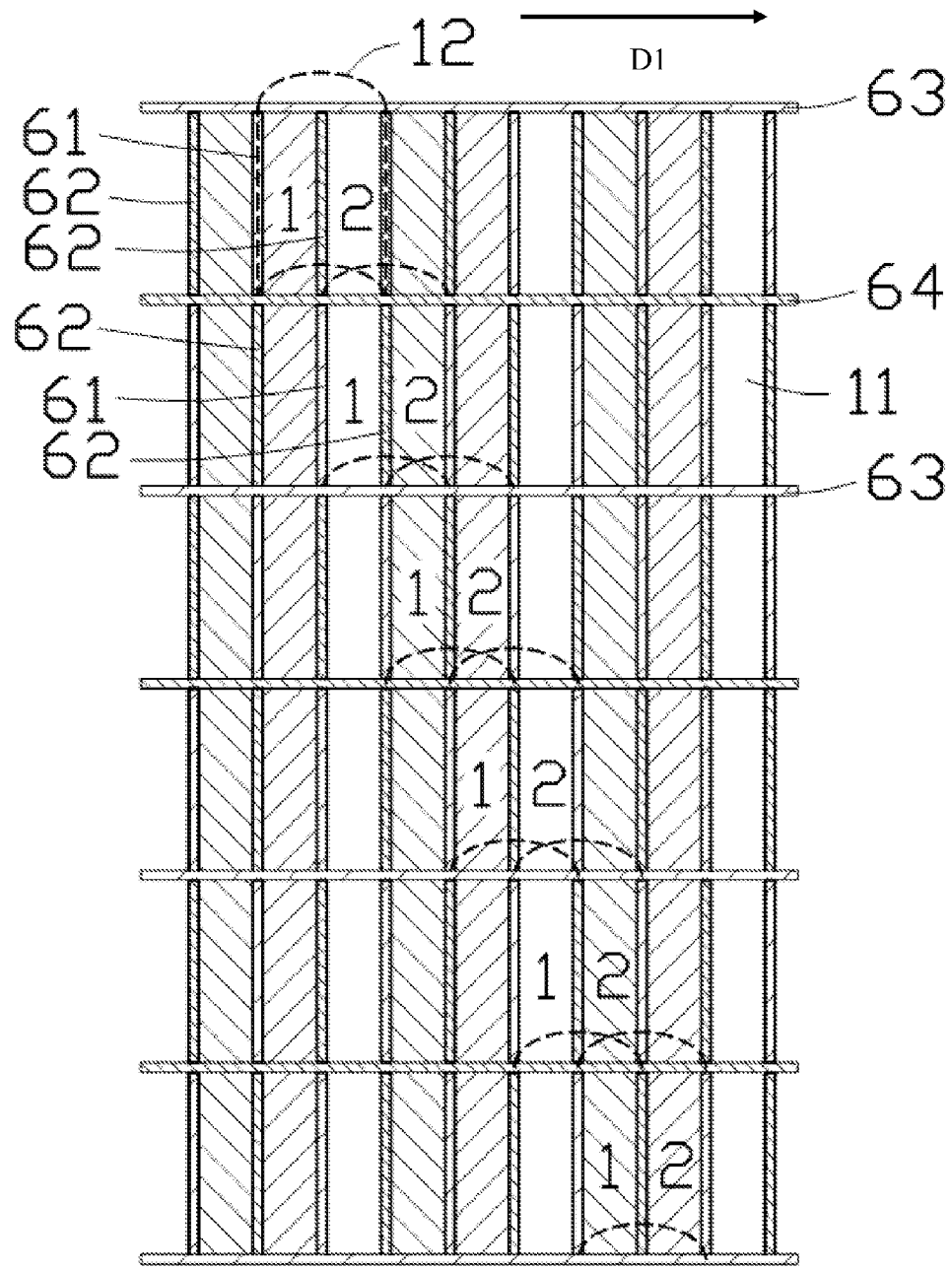

Referring to FIG. 7A and FIG. 7B, the connection electrodes 63, 64 extend along the first direction D1, and reach row edges of the pixel units 11. The working electrodes 61, 62 extend along the second direction D2, and reach column edges of the pixel units 11. Therefore, the arrangement of the working electrodes 61, 62 and the connection electrodes 63, 64 may keep an aperture ratio of the stereo display apparatus.

A principle of the stereo display apparatus of the third embodiment will be described below.

Referring to FIG. 6, the common electrode 65 receives a reference voltage. The working electrodes 61, 62 receive operating voltages, respectively, which means different operating voltages may be applied to the connection electrodes 63, 64. Thus, voltage differences are generated between the common electrode 65 and the working electrodes 61, 62, respectively. For example, the voltage difference between the common electrode 65 and the working electrode 61 is greater than that between the common electrode 65 and the working electrode 62. The voltage difference therefore generates an electric field in the liquid crystal layer 66, and the electric field intensity is centrosymmetric, with a center where the working electrode 61 is located and an edge where the working electrode 62 is located. Liquid crystal molecules of the liquid crystal layer 66 are arrayed along a direction of the electric field. In the illustrated embodiment, a refraction index of the liquid crystal molecules parabolicly varies because of different orientations of the liquid crystal molecules of the liquid crystal layer 66. In detail, the parabola is centrosymmetric, with a center where the working electrode 61 is located and an edge where the working electrode 62 is located. Therefore, a plurality of lens units 12 are formed in the liquid crystal layer 66. In FIG. 7A, each lens unit 12 has a center where the working electrode 61 is located and an edge where the working electrode 62 is located. Thus, each lens unit 12 just covers two pixel units 11. Because the adjacent working electrodes 61 and the adjacent working electrodes 62 arrayed along the second direction D2 have a stagger arrangement along the first direction D1, the adjacent lens units 12 arrayed along the second direction D2 are staggered along the first direction D1.

Thus, the adjacent lens units 12 are arranged in terraced steps along the second direction D2.

Furthermore, a position of the lens unit 12 formed along the first direction D1 may be adjusted by changing the operating voltages applied to the working electrodes 61, 62. For example, the center and the edge of the lens unit 12 may be exchanged by exchanging the operating voltages applied to the working electrodes 61, 62. Therefore, the lens unit 12 may be moved left or right with a distance of a width of one pixel unit 11 along the first direction D1, i.e. the lens unit 12 may be changed from the position shown in FIG. 7A to that shown in FIG. 7B.

Thus, the lens unit 12 can be dynamically and quickly formed in specific zone and in specific time, which makes the stereo display apparatus of the third embodiment a scanning-type stereo display apparatus. In detail, left eye images and right eye images are divided into two groups of strip-type sub-images in an exemplary embodiment, respectively. The first group of left eye sub-images and the first group of right eye sub-images are alternately displayed in the first display period, and the lens units 12 are formed in specific positions to guide the first group of left eye sub-images to the left eye of the viewer and guide the first group of right eye sub-images to the right eye of the viewer. In a next display period, the second group of right eye sub-images are displayed in the position where the first group of left eye sub-images are displayed in the first display period, and the second group of left eye sub-images are displayed in the position where the first group of right eye sub-image are displayed in the first display period. Meanwhile, the position where the lens units 12 are formed is changed to guide the second group of left eye sub-images to the left eye of the viewer and guide the second group of right eye sub-images to the right eye of the viewer. Although the first and second groups of left eye sub-images are guided to the left eye of the viewer and the first and second groups of right eye sub-images are guided to the right eye of the viewer successively, the viewer feels the entire left eye images and the entire right eye images, respectively, due to the vision persistence of human eyes. Therefore, stereo effect can be viewed by the viewer.

When the operating voltages applied to the working electrodes 61, 62 and the reference voltage applied to the common electrode 65 are withdrawn, more appropriately speaking, when the electric filed between the working electrodes 61, 62 and the common electrode 65 disappears, there is no lens unit in the liquid crystal layer 66 and the liquid crystal layer 66 functions as a glass. Therefore, 2D display effect may be achieved, which means the stereo display apparatus of the third embodiment is a 2D/3D switchable display apparatus.

Preferably, the working electrodes 61, 62 and the connection electrodes 63, 64 may be made from transparent conductive materials.

Preferably, the working electrodes 61, 62 and the connection electrodes 63, 64 may be made from copper. Therefore, less width of lines, improved aperture ratio, improved brightness of images may be achieved.

Figure 8:
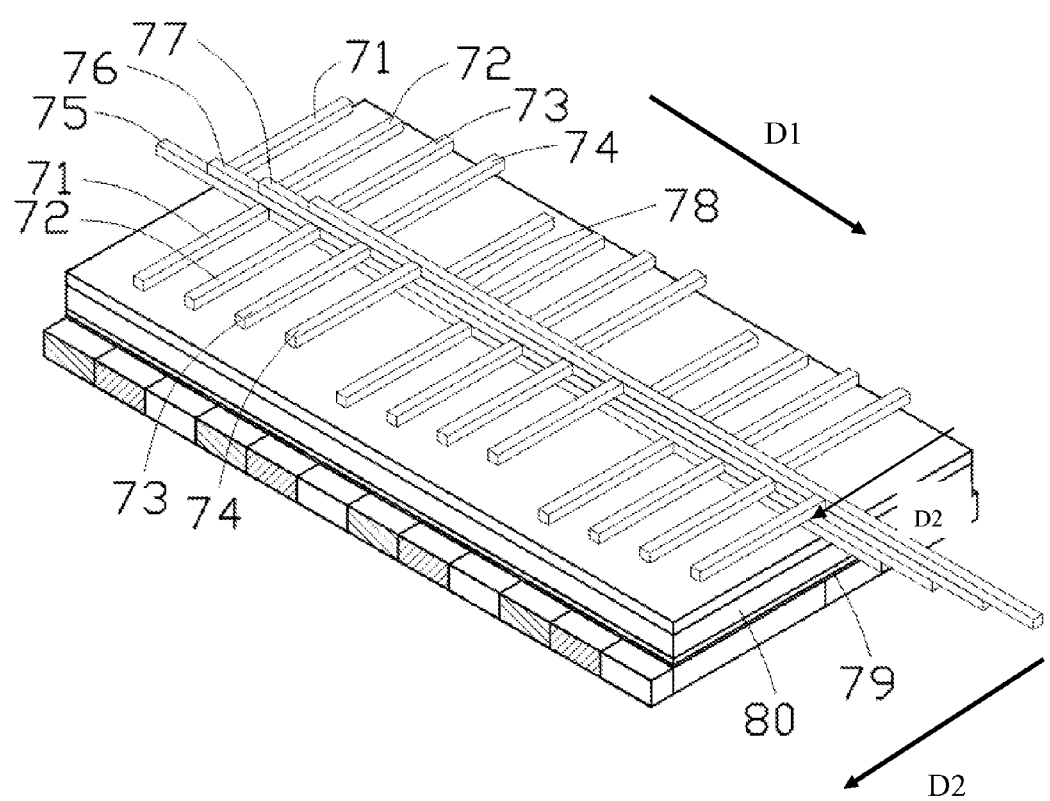
FIG. 8 shows a schematic, isomatic view of a stereo display apparatus according to a fourth embodiment of the present disclosure.

Referring to FIG. 8, a stereo display apparatus according to a fourth embodiment of the present disclosure is shown, which is an 8-view stereo display apparatus. A lens array of the stereo display apparatus of the fourth embodiment includes four groups of working electrodes 71, 72, 73, 74 extending along the second direction D2. The lens array further includes a plurality of connection electrodes 75, 76, 77, 78. The connection electrode 75 connects the working electrode 71, the connection electrode 76 connects the working electrode 72, the connection electrode 77 connects the working electrode 73, and the connection electrode 78 connects the working electrode 74.

In the illustrated embodiment, the working electrodes 71, 72, 73, 74 of different groups are alternately arranged along the first direction D1 and are spaced from each other, respectively. The adjacent working electrodes 71, 72, 73, 74 of the same group arrayed along the second direction D2 are stagger-arranged along the first direction D1. In the illustrated embodiment, the working electrodes 71, 72, 73, 74 staggerly extend from two opposite sides of the connection electrodes 75, 76, 77, 78, respectively. A stagger step between the adjacent working electrodes 71, 72, 73, 74 of the opposite sides of the connection electrodes 75, 76, 77, 78 is ¼ of a distance between the adjacent working electrodes 71, 72, 73, 74 of the same side of the connection electrodes 75, 76, 77, 78. Thus, the working electrodes 71, 72, 73, 74 are uniformly spaced from each other.

In FIG. 8, the connection electrodes 75, 76, 77, 78 connecting the working electrodes 71, 72, 73, 74 of different groups are overlapped with each other, respectively. In detail, the connection electrode 75 connecting the working electrode 71, the connection electrode 76 connecting the working electrode 72, the connection electrode 77 connecting the working electrode 73, and the connection electrode 78 connecting the working electrode 74 are overlapped with each other, respectively. Alternatively, the working electrodes 71, 72, 73, 74 and/or the connection electrodes 75, 76, 77, 78 may be arranged in a same layer.

Similarly, organic or inorganic material having high resistance may be arranged between the adjacent working electrodes 71, 72, 73, 74 for achieving uniform electric field therebetween. The number of the working electrodes 71, 72, 73, 74 may also be reduced so as to simplify the structure of the stereo display apparatus.

Referring to FIG. 8, the lens array further includes a common electrode 79 spaced from the working electrodes 71, 72, 73, 74, and a liquid crystal 80 arranged between the common electrode 79 and the working electrodes 71, 72, 73, 74.

Figure 9A:
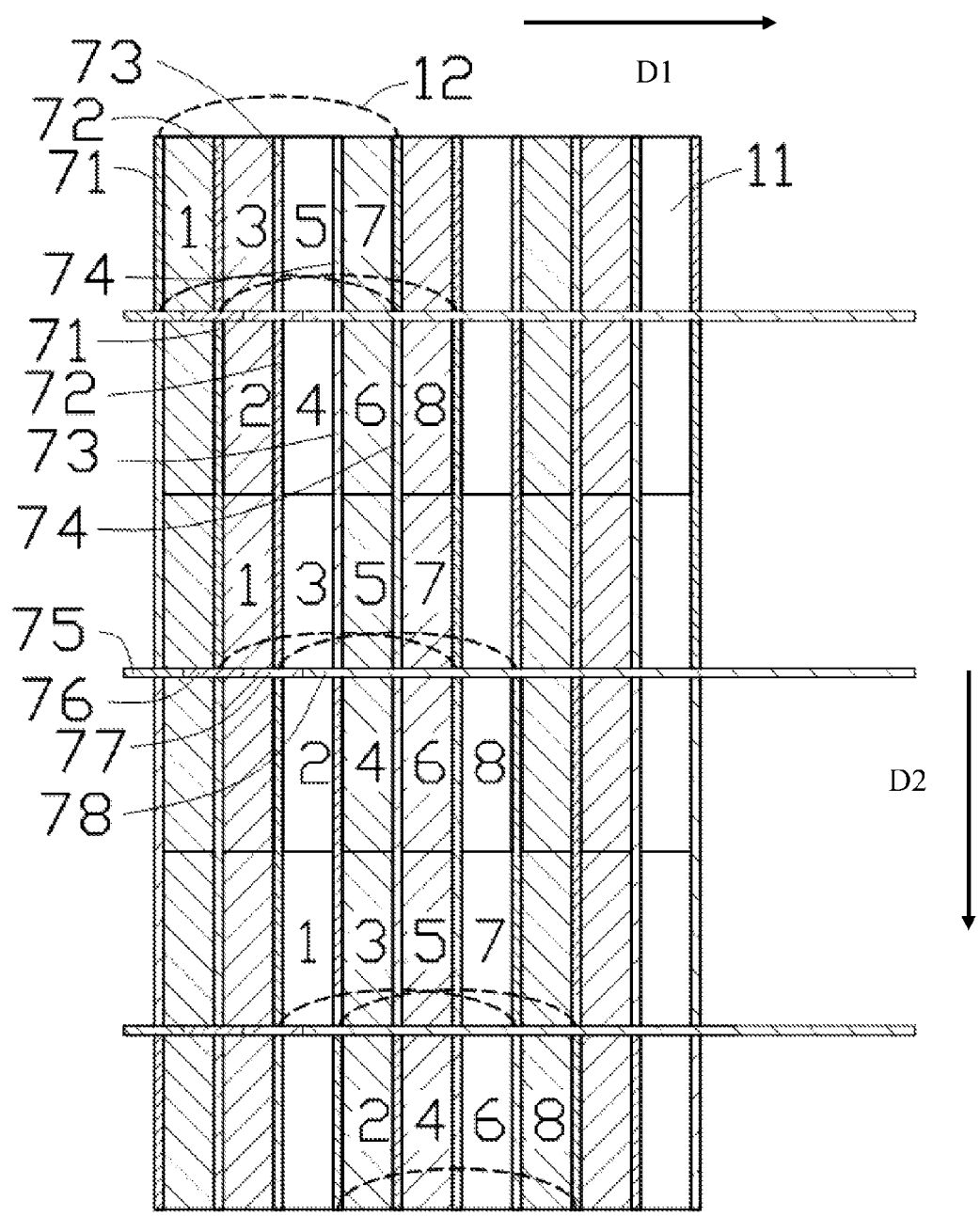
FIG. 9A and FIG. 9B show schematic, top plan views of the stereo display apparatus of FIG. 8, respectively.
Figure 9B:
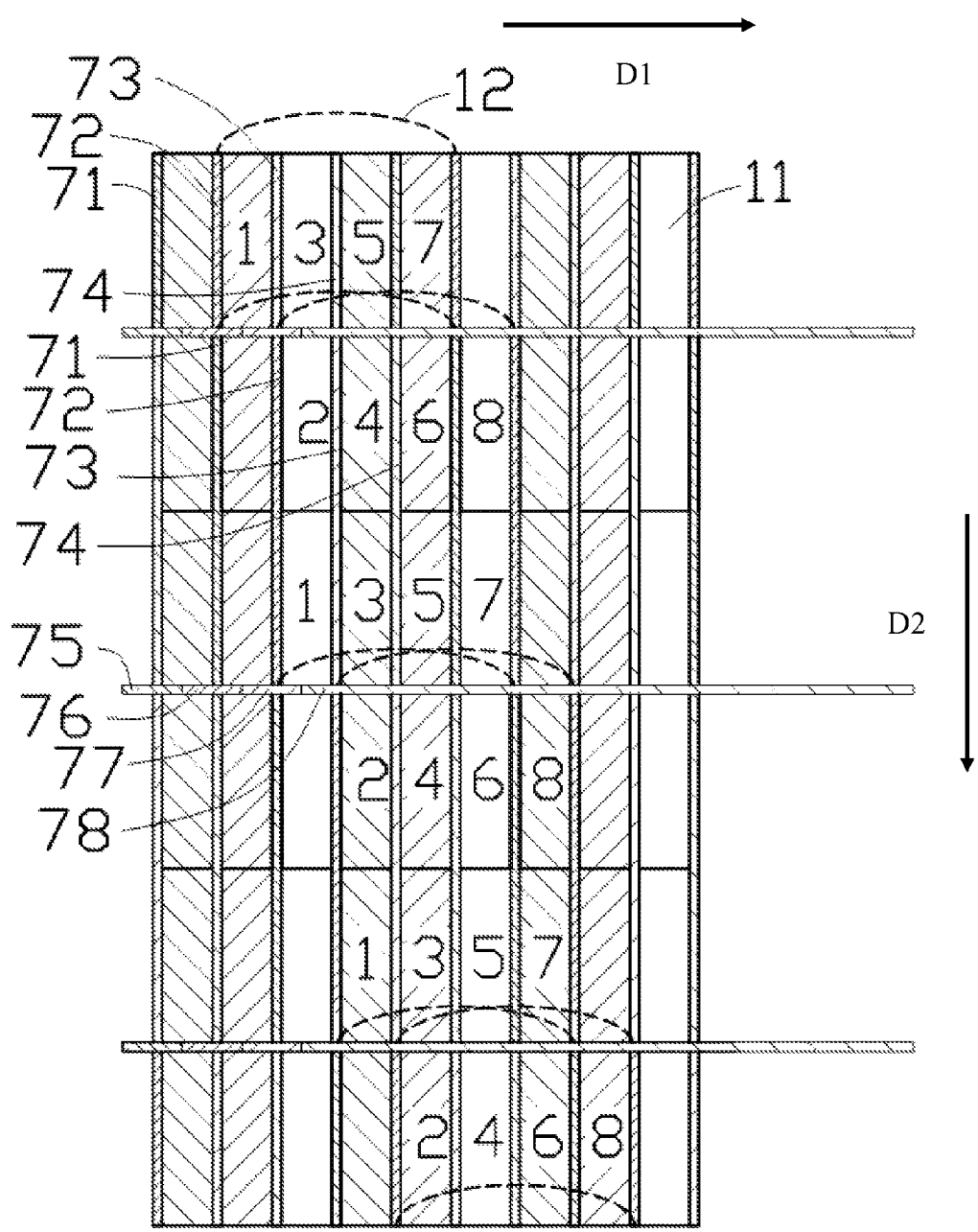

Referring to FIG. 9A and FIG. 9B, in the stereo display apparatus of the fourth embodiment, the connection electrodes 75, 76, 77, 78 extend along the first direction D1, and reach row edges of the pixel units 11. The working electrodes 71, 72, 73, 74 extend along the second direction D2, and reach column edges of the pixel units 11. Black matrix is generally arranged between the pixel units 11 in order to avoid interference. Therefore, such arrangement of the working electrodes 71, 72, 73, 74 and the connection electrodes 75, 76, 77, 78 may keep an aperture ratio of the stereo display apparatus.

A principle of the stereo display apparatus of the fourth embodiment will be described below.

Referring to FIG. 8, the common electrode 79 receives a reference voltage. The working electrodes 71, 72, 73, 74 receive operating voltages, respectively, which means different operating voltages may be applied to the connection electrodes 75, 76, 77, 78. Thus, voltage differences are generated between the common electrode 79 and the working electrodes 71, 72, 73, 74, respectively. For example, the voltage difference between the common electrode 79 and the working electrode 73 is maximal, the voltage difference between the common electrode 79 and the working electrodes 72 are equal to each other, and the voltage difference between the common electrode 79 and the working electrodes 71 is minimal. The voltage difference therefore generates an electric field in the liquid crystal layer 80, and the electric field intensity is centrosymmetric, with a center where the working electrode 73 is located and an edge where the working electrode 71 is located. Liquid crystal molecules of the liquid crystal layer 80 are arrayed along a direction of the electric field. In the illustrated embodiment, a refraction index of the liquid crystal molecules parabolicly varies because of different orientations of the liquid crystal molecules of the liquid crystal layer 80. In detail, the parabola is centrosymmetric, with a center where the working electrode 73 is located and an edge where the working electrode 71 is located. Therefore, a plurality of lens units 12 are formed in the liquid crystal layer 80. In FIG. 9A, each lens unit 12 has a center where the working electrode 73 is located and an edge where the working electrode 71 is located. Thus, each lens unit 12 just covers four pixel units 11 along the first direction D1 and two pixel units 11 along the second direction D2. Because the adjacent working electrodes 71, 72, 73, 74 of the same group arrayed along the second direction D2 have a stagger arrangement along the first direction D1, the adjacent lens units 12 arrayed along the second direction D2 are staggered along the first direction D1. Thus, the adjacent lens units 12 are arranged in terraced steps along the second direction D2.

Furthermore, a position of the lens unit 12 along the first direction D1 may be adjusted by changing the operating voltages applied to the working electrodes 71, 72, 73, 74. For example, the center and the edge of the lens unit 12 may be exchanged by exchanging the operating voltages applied to the working electrode 71, 72, 73, 74 in that order. Therefore, the lens unit 12 may be moved along the first direction D1, i.e. the lens unit 12 changed from the position shown in FIG. 9A to that shown in FIG. 9B.

Thus, the lens unit 12 can be dynamically and quickly formed in specific zone and in specific time, which makes the stereo display apparatus of the fourth embodiment a scanning-type stereo display apparatus similar to the display apparatus of the third embodiment.

When the operating voltages applied to the working electrodes 71, 72, 73, 74 and the reference voltage applied to the common electrode 79 are withdrawn, more appropriately speaking, when the electric fields between the working electrodes 71, 72, 73, 74 and the common electrode 79 disappear, there is no lens units in the liquid crystal layer 80 and the liquid crystal layer 80 functions as a glass. Therefore, 2D display effect may be achieved, which means the stereo display apparatus of the fourth embodiment is also a 2D/3D switchable display apparatus.

Preferably, the working electrodes 71, 72, 73, 74 and the connection electrodes 75, 76, 77, 78 may be made from transparent conductive materials.

Preferably, the working electrodes 71, 72, 73, 74 and the connection electrodes 75, 76, 77, 78 may be made from copper. Therefore, less width of lines, improved aperture ratio, improved brightness of images may be achieved.

Figure 3:
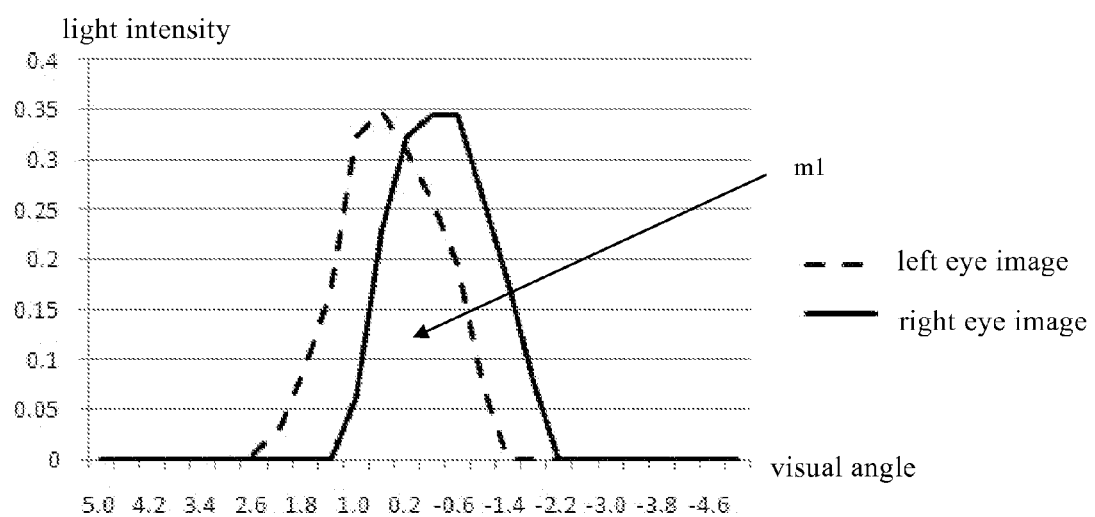
FIG. 3 shows an optic emulation chart showing a relationship between a light intensity and a visual angle according to FIG. 1.
Figure 10:
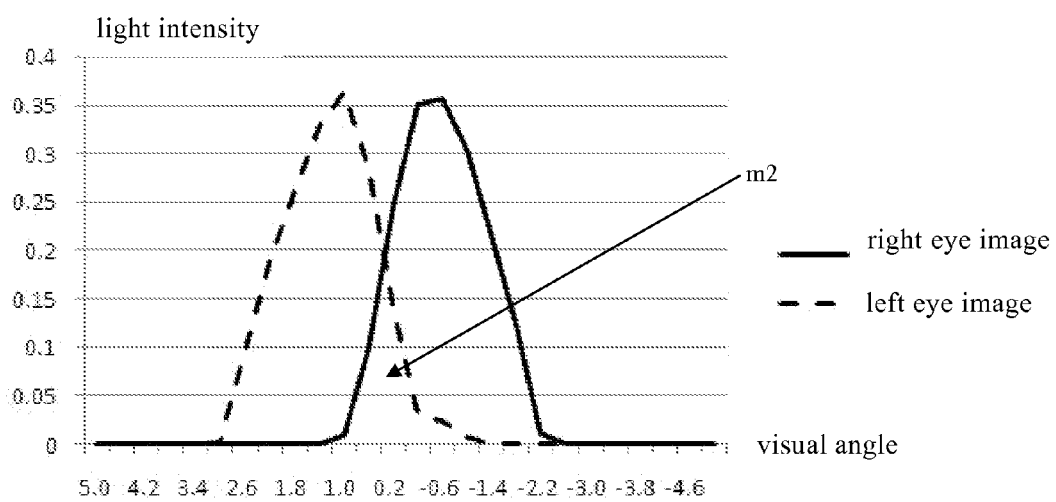
FIG. 10 shows an optic emulation chart showing a relationship between a light intensity and a visual angle according to the present disclosure.

Referring to FIG. 10, m2 represents a zone where the light beams of the left eye image and the right eye image overlap. Compared with the zone m1 of FIG. 3, the stereo display apparatus of the present disclosure may solve the problem of brightness interference.

In summary, the stereo display apparatuses of the present disclosure effectively improve the brightness performance, and vivid stereo scenes may be achieved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A stereo display apparatus, comprising:
a pixel array comprising a plurality of pixel units arrayed in parallel rows and parallel columns without staggering; and
a lens array covering the pixel array, the lens array comprising a plurality of lenticular lens units arrayed in said rows and columns, the lenticular lens units being parallel to each other and each lenticular lens unit covers at least two adjacent pixels in a same row;
wherein the adjacent lenticular lens units arrayed in columns have a stagger arrangement along a first direction along which the pixel units are arrayed in rows, thereby the adjacent lenticular lens units arrayed in columns are arranged in terraced steps and a series of sequentially terraced lenticular lens units, each from a separate row, form an equivalent lenticular lens unit at a tilted angle over corresponding non-staggering pixels of the pixel array; and
wherein the lens array is a liquid crystal lens array.

2. The stereo display apparatus of claim 1, wherein at least one lenticular lens unit covers n pixel units along the first direction and r pixel units along a second direction along which the pixel units are arrayed in columns, and the adjacent lenticular lens units arrayed along the second direction have a stagger arrangement along the first direction, and a stagger step therebetween equals to a width of m pixel units as measured along the first direction, wherein n represents a positive integer greater than 2 or equals to 2, m represents a positive integer less than n, and r represents a positive integer greater than 1 or equals to 1.

3. The stereo display apparatus of claim 2, wherein the pixel units alternately display at least two images along the first direction, and the n represents a quantity of the images displayed along the first direction by the pixel units arranged in the same row, and the m represents a quantity of the pixel units forming a stagger step between every two adjacent images displayed along the second direction.

4. The stereo display apparatus of claim 1, wherein the liquid crystal lens array comprises a plurality of groups of working electrodes arrayed along the second direction, and the working electrodes of different groups are spaced from each other and have a stagger arrangement along the first direction, and the adjacent working electrodes of the same group along the second direction have a stagger arrangement to form the plurality of lenticular lens units such that the terraced equivalent lenticular lens unit can be dynamically created and the terraced equivalent lenticular lens unit can be dynamically shifted along the second direction by one pixel.

5. The stereo display apparatus of claim 4, wherein the working electrodes extend along the second direction to an edge where the pixel units of adjacent columns meet.

6. The stereo display apparatus of claim 4, wherein the liquid crystal lens array further comprises a plurality of connection electrodes, and the connection electrodes connect the working electrodes of the same group, respectively.

7. The stereo display apparatus of claim 4, wherein the liquid crystal lens array further comprises a common electrode arranged spaced from the working electrodes, and a liquid crystal layer arranged between the common electrode and the working electrodes.

8. The stereo display apparatus of claim 7, wherein the common electrode receives a reference voltage, the working electrodes receive corresponding operating voltages, respectively, and liquid crystal molecules of the liquid crystal are oriented to form the lenticular lens units.

9. The stereo display apparatus of claim 8, wherein an arrangement of the lenticular lens unit is rearranged when the operating voltages change.

10. A lens array for a stereo display apparatus containing a pixel array comprising a plurality of pixel units arrayed in parallel rows and parallel columns without staggering, comprising:
a plurality of lenticular lens units arrayed in rows and columns, the lenticular lens units being parallel to each other and each lenticular lens unit covers at least two adjacent pixels in a same row;
wherein the adjacent lenticular lens units arrayed in columns have a stagger arrangement along a first direction along which the lenticular lens units are arrayed in rows, thereby the adjacent lenticular lens units arrayed in columns are arranged in terraced steps and a series of sequentially terraced lenticular lens units, each from a separate row, form an equivalent lenticular lens unit at a tilted angle over corresponding non-staggering pixels of the pixel array; and
wherein the lens array is a liquid crystal lens array.

11. The lens array of claim 10, wherein the liquid crystal lens array comprises a plurality of groups of working electrodes arrayed along the second direction, and the working electrodes of different groups are spaced from each other and have a stagger arrangement along the first direction, and the adjacent working electrodes of the same group along the second direction have a stagger arrangement to form the plurality of lenticular lens units such that the terraced equivalent lenticular lens unit can be dynamically created and terraced equivalent lenticular lens unit can be dynamically shifted along the second direction by one pixel.

12. The lens array of claim 11, wherein the working electrode extends along the second direction to an edge where the lenticular lens units of adjacent columns meet.

13. The lens array of claim 11, wherein the liquid crystal lens array further comprises a plurality of connection electrodes, and the connection electrodes connect to the working electrodes of the same group, respectively.

14. The lens array of claim 11, wherein the liquid crystal lens array further comprises a common electrode arranged spaced from the working electrodes, and a liquid crystal layer arranged between the common electrode and the working electrodes.

15. The lens array of claim 14, wherein the common electrode receives a reference voltage, the working electrodes receive corresponding operating voltages, respectively, and liquid crystal molecules of the liquid crystal are oriented to form the lenticular lens units.

16. The lens array of claim 15, wherein a position of the lenticular lens unit varies when the operating voltages are changed.

* * * * *